(12) United States Patent
Beggs et al.

(10) Patent No.: US 6,499,569 B1
(45) Date of Patent: Dec. 31, 2002

(54) DAMPED ANCHOR SHIM FOR DRUM BRAKE ASSEMBLY

(75) Inventors: Mark Beggs, Westland, MI (US); Frank Connolly, West Bloomfield, MI (US); Li Jun Zeng, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/860,751

(22) Filed: May 18, 2001

(51) Int. Cl.$^7$ ................................. F16D 65/38
(52) U.S. Cl. .................... 188/73.37; 188/205 A; 188/206 A; 188/250 F; 188/341
(58) Field of Search ............... 188/74, 205 A, 188/216, 217, 250 F, 327, 328, 334, 341, 73.36, 73.37, 206 A, 250 E, 250 G

(56) References Cited

U.S. PATENT DOCUMENTS

| | | | | |
|---|---|---|---|---|
| 3,283,858 A | * | 11/1966 | Mossey et al. | 188/206 A |
| 4,216,850 A | * | 8/1980 | Kizaki | 188/216 |
| 4,467,897 A | * | 8/1984 | Kubo et al. | 188/205 A |
| 4,987,979 A | * | 1/1991 | Wicks | 188/250 C |
| 5,099,967 A | * | 3/1992 | Lang | 188/205 A |
| 6,131,708 A | * | 10/2000 | Fujiwara | 188/205 A |

* cited by examiner

*Primary Examiner*—Pam Rodriguez
(74) *Attorney, Agent, or Firm*—MacMillan, Sobanski & Todd, LLC

(57) ABSTRACT

This invention related to a multi-layered damped anchor shim adapted for use in a drum brake assembly. The anchor shim includes an inner surface and an outer surface which is adapted to contact the second ends of the brake shoes. The anchor shim includes a damping material applied to the inner surface thereof so as to be disposed between adjacent contacting areas of the outer surface of the inner retainer plate and the inner surface of the anchor shim to thereby reduce the transmission of noise from the brake shoes through the abutment assembly to the backing plate.

10 Claims, 3 Drawing Sheets

US 6,499,569 B1

DAMPED ANCHOR SHIM FOR DRUM BRAKE ASSEMBLY

BACKGROUND OF THE INVENTION

This invention relates in general to vehicle drum brake assemblies and in particular to an improved damped anchor shim for use in such a vehicle drum brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies can be actuated by hydraulic, pneumatic, or mechanical pressure generated by an operator of the vehicle depressing a foot pedal, pulling a hand lever, and the like. The structure and operation of both drum brake assemblies and disc brake assemblies, as well as the actuators therefor, are well known in the art.

A typical drum brake assembly includes a backing plate which is secured to a fixed, non-rotatable component of the vehicle, such as the vehicle axle housing, and an abutment assembly secured to the backing plate. A pair of opposed arcuate brake shoes are supported on the backing plate for selective movement relative thereto. Each of the brake shoes has a friction pad or lining secured thereto. Each of the brake shoes includes a lower end which engages a portion of the abutment assembly so as to pivotally support the brake shoes relative to the backing plate. In order to maintain the lower ends of the brake shoes in engagement with the abutment assembly, a spring is typically secured to the shoes adjacent the lower ends thereof and urges the shoes into engagement with the abutment assembly.

The drum brake assembly further includes a hollow cylindrical brake drum which is secured to the vehicle wheel for rotation therewith. The hollow interior of the brake drum defines an inner cylindrical braking surface. The brake drum is disposed adjacent to the backing plate such that the brake shoes extend within the cylindrical braking surface. To effect braking action, the brake shoes are moved outwardly apart from one another such that the friction pads frictionally engage the cylindrical braking surface of the brake drum. Such frictional engagement causes slowing or stopping of the rotational movement of the brake drum and, therefore, the wheel of the vehicle in a controlled manner.

One or more actuating mechanisms are provided in the drum brake assembly for selectively moving the brake shoes outwardly apart from one another into frictional engagement with the cylindrical braking surface of the brake drum. Usually, a hydraulically or pneumatically actuated service brake mechanism is provided for selectively actuating the drum brake assembly under normal operating conditions. Such a service brake mechanism can include a hydraulic cylinder having a pair of opposed pistons which abut and move the brake shoes apart from one another into frictional engagement with the cylindrical braking surface of the brake drum. A mechanically actuated parking and emergency brake mechanism is also usually provided for selectively actuating the drum brake assembly. The parking and service brake mechanism can include an actuating lever pivotally supported on one of the brake shoes. The actuating lever is connected to a cable which, when pulled, moves the brake shoes apart from one another into frictional engagement with the cylindrical braking surface of the brake drum.

As discussed above, the lower ends of the brake shoes are in engagement with the abutment assembly. Also, since the abutment assembly is operative to transfer braking torque during braking from the associated brake shoes to the frame of the vehicle, undesirable vibration, rattle or other noises may be transmitted to the frame during such braking. To prevent this from occurring, it is known to provide an anti-rattle clip in the drum brake assembly. The anti-rattle clip is typically embodied as a flat spring metal member attached to the abutment assembly. The anti-rattle clip is operative to exert a force against the associated brake shoes to prevent them from rattling while limiting pad sliding resistance to an optimum level when the drum brake assembly is disengaged. A number of anti-rattle clip structures are known in the art for use with the friction pads of drum brake assemblies.

SUMMARY OF THE INVENTION

This invention relates to an improved drum brake assembly having at least one damped brake shoe anchor shim support device secured to an associated backing plate which is effective to reduce brake noise during actuation of the drum brake assembly. The drum brake assembly includes a backing plate, a pair of brake shoes supported on the backing plate for selective movement into frictional engagement with a brake drum, a brake mechanism, and an abutment assembly secured to the backing plate. Each of the brake shoes includes a first end and an opposite second end. The drum brake assembly further includes a brake mechanism adapted to engage the first ends of the brake shoes so as to cause the brake shoes to move outwardly into frictional engagement with the brake drum. The abutment assembly includes an inner retainer plate disposed adjacent the backing plate, an outer retainer plate, and an anchor shim carried by the inner retainer plate and interposed between the backing plate and the retainer outer plate. The anchor shim includes an inner surface and an outer surface which is adapted to contact the second ends of the brake shoes. The anchor shim includes a damping material applied to the inner surface thereof so as to be disposed between adjacent contacting areas of the outer surface of the inner retainer plate and the inner surface of the anchor shim to thereby reduce the transmission of noise from the brake shoes through the abutment assembly to the backing plate.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
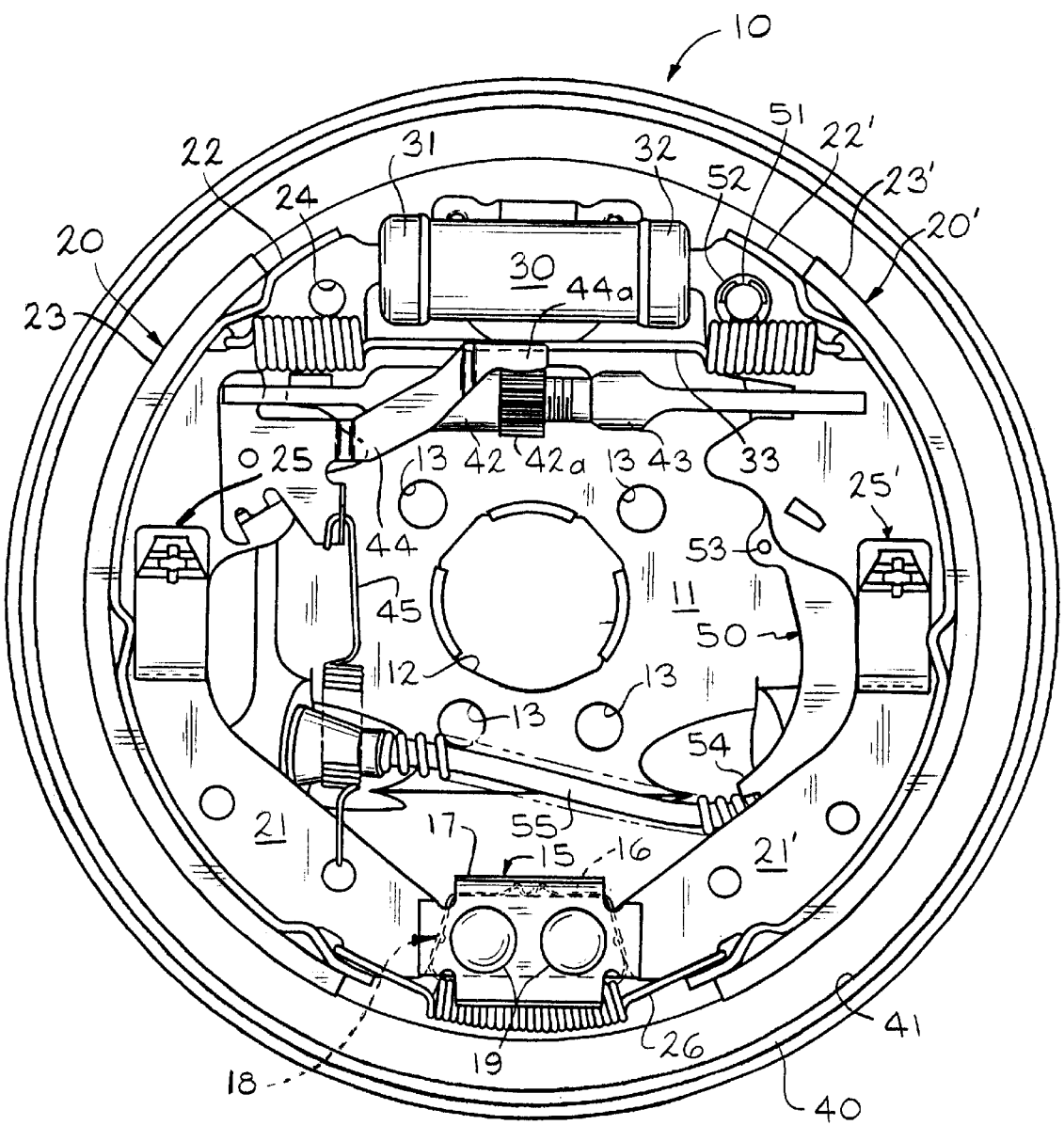
FIG. 1 is a plan view of a portion of a prior art drum brake assembly.

Referring now to the drawings, there is illustrated in FIG. 1 a portion of a prior art drum brake assembly, indicated generally at 10. The illustrated prior art drum brake assembly 10 is associated with a left rear wheel (not shown) of a vehicle. The general structure and operation of the prior art drum brake assembly 10 is conventional in the art. Thus, only those portions of the prior art drum brake assembly 10 which are necessary for a full understanding of this invention will be explained and illustrated in detail. Although this invention will be described and illustrated in conjunction with the particular vehicle drum brake assembly 10 disclosed herein, it will be appreciated that this invention may be used in conjunction with other drum and disc brake assemblies.

The illustrated prior art drum brake assembly 10 includes a rigid backing plate 11 which is generally flat and circular in shape. The backing plate 11 is adapted to be secured to a fixed, non-rotatable component of the vehicle, such as an outer end of a housing (not shown) for enclosing a rotatable axle (not shown). To accomplish this, a relatively large opening 12 is formed through the central portion of the backing plate 11. The central opening 12 is provided to permit the outer end of the rotatable axle to extend therethrough to the driven vehicle wheel (not shown). A plurality of relatively smaller holes 13 are also formed through the backing plate 12, located about the central opening 12. The smaller holes 13 are provided to permit threaded bolts (not shown) to extend therethrough to secure the backing plate 12 to the outer end of the axle.

An abutment block assembly, indicated generally at 15, is provided on the outer surface of the backing plate 11. The abutment block assembly 15 includes an inner spacer plate 16 (shown in phantom), which is disposed adjacent to the outer surface of the backing plate 11, an outer retainer plate 17, which is disposed adjacent to the spacer plate 16, and an anchor shim 18 (shown in phantom), which is disposed between the backing plate 11 and the outer retainer plate 17. The inner spacer plate 16 and the outer retainer plate 17 are secured to the backing plate 11 by a pair of rivets 19 or similar fasteners which extend therethrough to the inner surface of the backing plate 11. The anchor shim 18 can be installed on the inner spacer plate 16 prior to assembly and installation of the outer retainer plate 17 and the rivets 19 or can be installed on the inner spacer plate 16 subsequent to securing the abutment block assembly 15 to the backing plate 11. In either case, the anchor shim 18 is attached to the inner spacer plate 16 and is interposed between the backing plate 11 and the outer retainer plate 17.

The prior art drum brake assembly 10 further includes first and second brake shoes, indicated generally at 20 and 20'. Structurally, the brake shoes 20 and 20' are essentially mirror images of one another, and like reference numbers are used to indicate similar parts. The brake shoes 20 and 20' include respective web portions 21 and 21' which are generally flat and crescent-shaped. Arcuate table portions 22 and 22' are secured to the respective opposed outer curved surfaces of the web portions 21 and 21', such as by welding. A friction pad 23 is secured to the outer arcuate surface of the table portion 22 of the brake shoe 20, while a friction pad 23' is secured to the outer arcuate surface of the table portion 22' of the brake shoe 20'. A circular aperture 24 is formed through the upper end of the web portion 21 of the brake shoe 20, and a similar aperture (not shown) is formed through the upper end of the web portion 21' of the brake shoe 20' for a purpose which will be explained below.

The first and second brake shoes 20 and 20' are supported on the backing plate 11 by respective pivot pin and spring-clip assemblies, indicated generally at 25 and 25', which are conventional in the art. As shown by the dotted lines in FIG. 1, the lower ends of the web portions 21 and 21' of the brake shoes 20 and 20' are slightly curved. The curved lower ends of the web portions 21 and 21' are received between the backing plate 11 and the retainer plate 17 and extend into abutment with the opposed side surfaces of the spacer plate 16. A first coiled spring 26 has hooked ends which extend through respective openings formed through the lower ends of the web portions 21 and 21' so as to urge such lower ends thereof into abutment with the associated opposed side surfaces of the damped anchor shim 70.

The prior art drum brake assembly 10 further includes service brake mechanism for actuating the drum brake assembly 10 under normal operating conditions. The service brake mechanism includes a hydraulic actuator 30 which is secured to the backing plate 11 between the upper ends of the web portions 21 and 21' of the brake shoes 20 and 20', respectively. The hydraulic actuator 30 includes a pair of opposed pistons 31 and 32 which respectively abut the upper ends of the web portions 21 and 21'. A second coiled spring 33 has hooked ends which extend through respective openings formed through the upper ends of the web portions 21 and 21' so as to urge such upper ends thereof into abutment with the pistons 31 and 32. The hydraulic actuator 30 is connected to a conventional source of pressurized hydraulic or pneumatic fluid (not shown) for operating the prior art drum brake assembly 10.

The prior art drum brake assembly 10 further includes a hollow cylindrical brake drum 40 which is secured to a wheel (not shown) of the vehicle for rotation therewith. The interior of the brake drum defines a cylindrical braking surface 41. When installed, the brake drum 40 is disposed adjacent to the backing plate 11 such that the brake shoes 20 and 20' extend within the cylindrical braking surface 41. To effect braking action, the brake shoes 20 and 20' are moved outwardly apart from one another so as to frictionally engage the cylindrical braking surface 41 of the brake drum 40. Such frictional engagement causes slowing or stopping of the rotational movement of the brake drum 40 and, therefore, the wheel of the vehicle in a controlled manner.

The hydraulic actuator 30 is used to operate the prior art drum brake assembly 10 under normal service conditions. When it is desired to actuate the prior art drum brake assembly 10, pressurized hydraulic or pneumatic fluid is supplied to the hydraulic actuator 30. Typically, this is accomplished by the operator of the vehicle depressing the brake pedal in the driver compartment of the vehicle. When such pressurized hydraulic or pneumatic fluid is supplied to the hydraulic actuator 30, the pistons 31 and 32 are moved apart from one another. As a result, the upper ends of the brake shoes 20 and 20' are also moved apart from one another, essentially pivoting about the abutment block assembly 15. This movement causes the friction pads 23 and 23' to move into frictional engagement with the cylindrical braking surface 41 of the brake drum 40. The abutment block assembly 15 functions to transfer the braking torque from the leading brake shoe (i.e., the left brake shoe 20 when the brake drum 40 is rotating in a counter-clockwise direction) to the frame of the vehicle. When the brake shoes 20 and 20' are moved apart from one another, the second coiled spring 33 is expanded. Thus, when the pressurized hydraulic or pneumatic fluid to the hydraulic actuator 30 is subsequently released, the second coiled spring 33 retracts the brake shoes 20 and 20' inwardly toward one another and out of frictional engagement with the cylindrical braking surface 41 of the brake drum 40.

The prior art drum brake assembly 10 also includes an automatic adjusting mechanism to compensate for thinning of the friction pads 23 and 23' resulting from wear caused by repeated use. The illustrated automatic adjusting mechanism is conventional in the art and includes a pair of mutually threaded struts 42 and 43 having opposed slotted ends. The upper ends of the web portions 21 and 21' of the brake shoes 20 and 20', respectively, are received within the slotted ends of the struts 42 and 43. A star wheel portion 42a is formed integrally on the strut 42. An adjuster lever 44 is pivotally mounted on the web portion 21 of the brake shoe 20. The adjuster lever 44 has a protruding arm portion 44a which extends into cooperation with the star wheel portion 42a of the strut 42. A third coiled spring 45 has hooked ends which extend through respective openings formed through the adjuster lever 44 and the lower end of the web portion 21 so as to urge the protruding arm portion 44a of the adjuster lever 44 into engagement with the star wheel portion 42a of the strut 42.

As is known, when the brake shoes 20 and 20' are moved outwardly apart from one another such that the friction pads 23 and 23', respectively, frictionally engage the cylindrical braking surface 41 of the brake drum 40, the adjusting lever 44 is pivoted. When a sufficient amount of wear has occurred on the friction pads 23 and 23', the adjusting lever 44 will be pivoted a sufficient amount so as to rotate the star wheel portion 42a and the strut 42 relative to the strut 43. Such relative rotation causes the opposed ends of the struts 42 and 43 to be moved slightly farther apart from one another, together with the associated upper ends of the brake shoes 20 and 20'. Thus, the automatic adjusting mechanism functions to maintain a predetermined clearance between the friction pads 23 and 23' of the brake shoes 20 and 20', respectively, and the cylindrical braking surface 41 of the brake drum 40 as wear occurs during operation of the prior art drum brake assembly 10.

In addition to the service brake mechanism described above, the prior art drum brake assembly 10 further includes a mechanically actuated parking and emergency brake mechanism. The parking and emergency brake mechanism includes an actuating lever, indicated generally at 50. The actuating lever 50 is pivotally supported on the web 21' of brake shoe 20 by a pivot pin assembly which includes a pivot pin 51 having an enlarged head and a reduced diameter body. The body of the pivot pin 51 is inserted through respective aligned apertures formed through the actuating lever 50 and the web portion 21' of the brake shoe 20'. An E-clip 52 is then installed in a groove formed about the end of the body of the pivot pin 51 to retain it in the apertures such that the actuating lever 50 is pivotally supported on the brake shoe 20'. The actuating lever 50 further includes an upstanding pin 53, and a hooked lower end portion 54. The hooked end portion 54 facilitates the connection of one end of an actuating cable 55 thereto. The actuating cable 55 is conventional in the art and is connected to a hand operated lever (not shown) or similar manually operable parking and emergency brake mechanism for selectively actuating the prior art drum brake assembly 10. The structure and operation of the prior art drum brake assembly 10 thus far described is conventional in the art.

Figure 2:
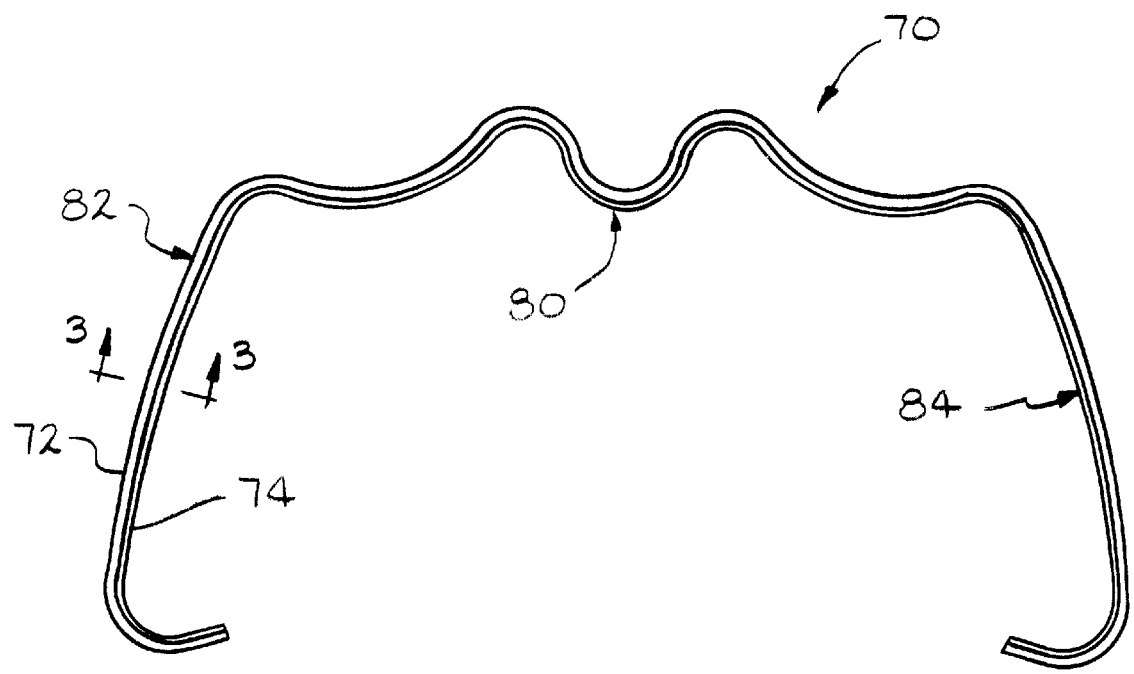
FIG. 2 is a plan view of a damped anchor shim in accordance with the present invention.
Figure 3:
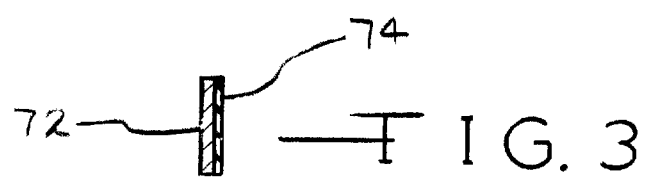
FIG. 3 is a sectional view of the damped anchor shim taken along line 3—3 of FIG. 2.
Figure 4:
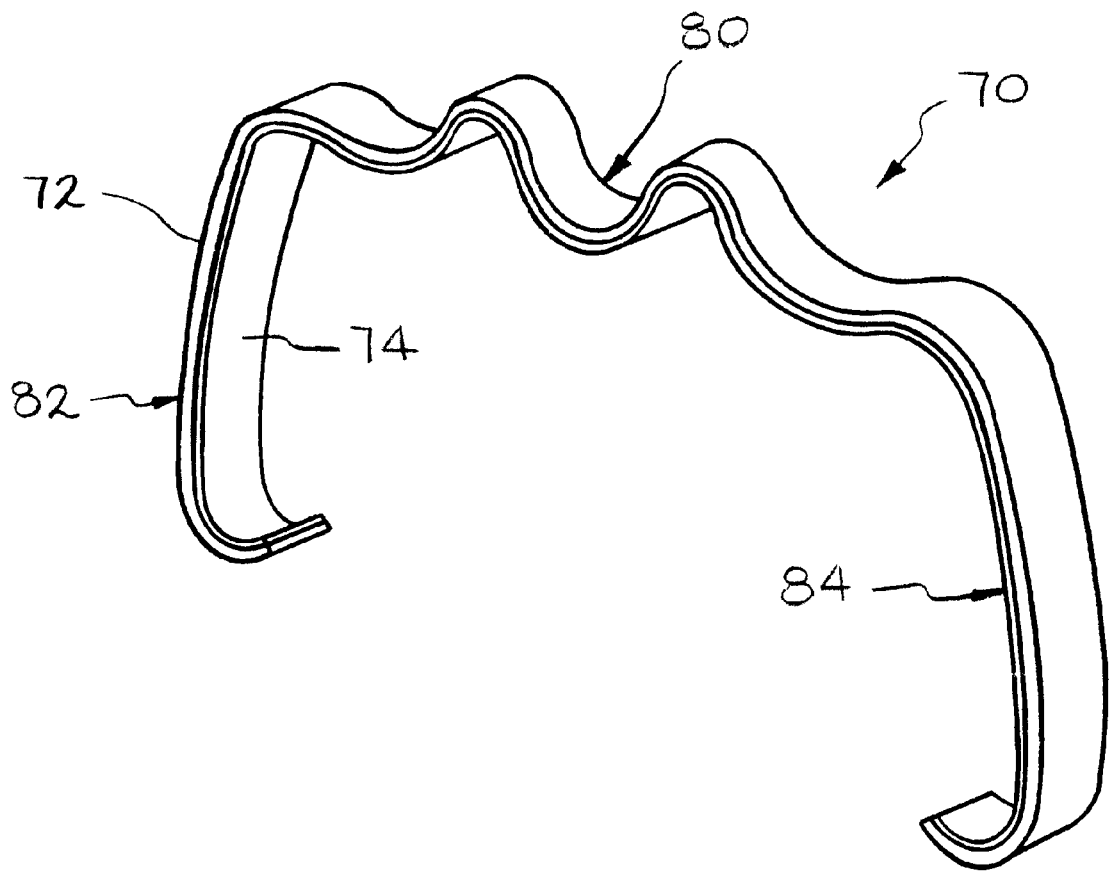
FIG. 4 is a perspective view of the damped anchor shim shown in FIGS. 2 and 3.

Referring now to FIGS. 2–4, there is illustrated a damped anchor shim, indicated generally at 70, in accordance with the present invention. As shown therein, the damped anchor shim 70 is a multi-layered shim and includes an outer layer 72 and an inner layer 74. Preferably, the outer layer 72 is formed from a metal and defines a metal body, and the inner layer 74 is formed from a damping material.

In the illustrated embodiment, the damping material 74 covers the entire inner surface of the metal body 72. In particular, the metal body 72 of the damping anchor shim 70 is formed from a strip of stainless steel, and the damping material 74 is vulcanized to the metal body 72. Preferably, the damping material 74 is vulcanized to the metal body 72 prior to the forming of the damped anchor shim 70 into its desired final shape by a stamping operation. A preferred damping material 74 is a nitrile rubber MD-386 manufactured by Trelleborg Automotive of South Haven, Mich. Preferably, the metal body 72 is formed from stainless steel having a stock thickness of around 0.30 mm, and the damping material 74 is formed from the nitrile rubber having a stock thickness of around 0.14 mm. Alternatively, the damping material 74 could be formed from other materials and/or could cover less than the entire inner surface of the metal body 72. For example, the damping material 74 could cover the inner surface of the metal body 72 only at those portions which contact adjacent areas of the abutment assembly 15. Also, the damping material 74 could be applied directly to the associated selected surface or surfaces of the abutment assembly 15 prior to the installation of the associated metal body 72 thereon. In addition, the particular shape of the damped anchor shim 70 can be other than illustrated if desired. As best shown in FIGS. 2 and 4, the damped anchor shim 70 is formed having a central portion 80 and a pair of arms, indicated generally at 82 and 84, which extend outwardly from the central mounting portion 80. In the illustrated embodiment, the arms 82 and 84 are identical to one another.

Although the damped anchor shim 70 of the present invention has been described for use with the particular drum brake structure 10 shown in the FIG. 1, the invention can be used with other kinds of drum brake structures.

In accordance with the provisions of the patent statutes, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A drum brake assembly adapted to selectively frictionally engage a brake drum comprising:

a backing plate supported relative to a vehicle component;

a pair of brake shoes supported on said backing plate for selective movement into frictional engagement with the brake drum, each of said brake shoes including a first end and an opposite second end;

a brake mechanism adapted to engage said first ends of said brake shoes so as to cause said brake shoes to move into frictional engagement with the brake drum; and an abutment assembly secured to said backing plate, said abutment assembly including an inner retainer plate disposed adjacent said backing plate, an outer retainer plate, and an anchor shim detachably carried by said inner retainer plate and interposed between said backing plate and said retainer outer plate, said inner retainer plate being generally rectangular in shape and defining a first pair of generally parallel sides and a second pair of generally parallel sides, said first pair of sides being greater than said second pair of sides, said anchor shim being a composite anchor shim having a central portion and a pair of arms which extend outwardly from said central mounting portion, wherein when said anchor shim is installed on said inner retainer plate, said central portion is disposed adjacent and completely spans the entire length of one of said first pair of sides of said inner retainer plate and said pair of arms are disposed adjacent and completely span the entire length of a respective one of said second pair of sides of said inner retainer plate, said anchor shim including an inner surface and an outer surface, said outer surface of said anchor shim adapted to contact said second ends of said brake shoes;

wherein said composite anchor shim includes a damping material applied to at least a portion of said inner surface of said anchor shim so as to define only a two-layered damped anchor shim, said two-layered damped anchor shim including an outer layer disposed adjacent said second ends of said brake shoes and in contact with at least a portion thereof, and an inner layer disposed adjacent said inner retainer plate and in contact with at least a portion thereof, said outer layer formed from a first material and said inner layer formed from said damping material.

2. The drum brake assembly defined in claim 1 wherein said first material of said outer layer is metal.

3. The drum brake assembly defined in claim 1 wherein said damping material of said inner layer covers the entire inner surface of said outer layer.

4. The drum brake assembly defined in claim 1 wherein said first material of said outer layer is a metal and said damping material is applied to said metal outer layer.

5. The drum brake assembly defined in claim 1 wherein said first material of said outer layer is a metal and said damping material is applied to said metal outer layer prior to the forming of said damped anchor shim by a stamping operation.

6. An abutment assembly for use in a drum brake assembly having a backing plate supported relative to a vehicle component, a pair of brake shoes supported on the backing plate for selective movement into frictional engagement with a brake drum, each of said brake shoes including a first end and an opposite second end, and a brake mechanism adapted to engage the first ends of the brake shoes so as to cause the brake shoes to move into frictional engagement with the brake drum, the abutment assembly comprising:

an inner retainer plate disposed adjacent the backing plate, an outer retainer plate, and an anchor shim detachably carried by said inner retainer plate and interposed between the backing plate and said retainer outer plate, said inner retainer plate being generally rectangular in shape and defining a first pair of generally parallel sides and a second pair of generally parallel sides, said first pair of sides being greater than said second pair of sides, said anchor shim being a composite anchor shim having a central portion and a pair of arms which extend outwardly from said central mounting portion, wherein when said anchor shim is installed on said inner retainer plate, said central portion is disposed adjacent and completely spans the entire length of one of said first pair of sides of said inner retainer plate and said pair of arms are disposed adjacent and completely span the entire length of a respective one of said second pair of sides of said inner retainer plate, said anchor shim including an inner surface and an outer surface, said outer surface of said anchor shim adapted to contact the second ends of the brake shoes;

wherein said composite anchor shim includes a damping material applied to at least a portion of said inner surface of said anchor shim so as to define only a two-layered damped anchor shim, said two-layered damped anchor shim including an outer layer disposed adjacent the second ends of said brake shoes and in contact with at least a portion thereof, and an inner layer disposed adjacent said inner retainer plate and in contact with at least a portion thereof, said outer layer formed from a first material and said inner layer formed from said damping material.

7. The abutment assembly defined in claim 6 wherein said first material of said outer layer is metal.

8. The abutment assembly defined in claim 6 wherein said damping material of said inner layer covers the entire inner surface of said outer layer.

9. The abutment assembly defined in claim 6 wherein said first material of said outer layer is a metal and said damping material is applied to said metal outer layer.

10. The abutment assembly defined in claim 6 wherein said first material of said outer layer is a metal and said damping material is applied to said metal outer layer prior to the forming of said damped anchor shim by a stamping operation.

* * * * *